United States Patent [19]

Rosenkranz

[11] Patent Number: 4,916,707
[45] Date of Patent: Apr. 10, 1990

[54] CONTROL CIRCUIT FOR A PULSED GAS LASER

[75] Inventor: Heribert Rosenkranz, Göttingen, Fed. Rep. of Germany

[73] Assignee: Lambda Physik, Gottingen, Fed. Rep. of Germany

[21] Appl. No.: 180,959

[22] Filed: Apr. 12, 1988

[30] Foreign Application Priority Data

Apr. 30, 1987 [DE] Fed. Rep. of Germany ....... 3714503

[51] Int. Cl.[4] ............................................. H01S 3/00
[52] U.S. Cl. ...................................... 372/38; 372/58; 372/59
[58] Field of Search ....................... 372/38, 33, 29, 30, 372/58, 59

[56] References Cited

U.S. PATENT DOCUMENTS

| | | | |
|---|---|---|---|
| 3,806,829 | 4/1974 | Duston et al. | 372/38 |
| 4,429,392 | 1/1984 | Yoshida et al. | 372/29 |
| 4,498,180 | 2/1985 | Severinsson | 372/38 |
| 4,633,525 | 12/1986 | Eumurian | 372/38 |

Primary Examiner—Frank Gonzalez
Attorney, Agent, or Firm—Irell & Manella

[57] ABSTRACT

A control circuit for a pulsed gas laser comprises a plurality of sensors 9, 12, a plurality of control members (e.g. 10) and a central control unit 13. Associated sensors and control members, i.e. sensors which measure a parameter variable by the associated control member, are connected jointly to modules 7, 8, 11 and each module comprises at least one microprocessor; the modules are connected by means of optical waveguides 20 in series in a ring to the central control unit 13. The arrangement makes it possible to save complicated electromagnetic shielding, provides easy fault tracing and simple expansion of the control circuit by further modules.

10 Claims, 3 Drawing Sheets

CONTROL CIRCUIT FOR A PULSED GAS LASER

BACKGROUND OF THE INVENTION

The invention relates to a control circuit for a pulsed gas laser having the features of the preamble of claim 1.

In the prior art pulsed gas lasers of various kinds are known, for example $N_2$ lasers, $CO_2$ lasers and excimer lasers. In such pulsed gas lasers a great number of sensors and control members are necessary. In this sense a sensor means a measuring instrument with which an actual state of the laser is measured, i.e. for example the pressure of the working gas of the laser, the voltage between the electrodes or also the energy contained in a laser pulse. Control members (actors) denotes means with which selectively parameters of the laser can be adjusted, such as the gas pressure (by means of a valve), the voltage between the electrodes or other optical parameters. The system of sensors and control members and means, including the associated control circuit, can be interpreted as a set of closed-loop control circuits with which the said parameters of the laser are adjusted so that desired values, for example as regards the energy of the laser pulses, the gas pressure, etc., are obtained.

Thus, in a gas laser of the type mentioned at the beginning a great number of sensors and control members is necessary which are each connected via lines to a central control unit. Since however a pulsed gas laser due to the high current peaks occurring on discharge represents a strong electromagnetic interference source, the connecting lines and leads, in particular with sensors with weak analog signals, require great expenditure on shielding to suppress interference. Moreover, a disadvantage of the known control circuits for pulsed gas lasers is that for each individual sensor and each control member a separate connector is necessary for connection to the central control unit so that a relatively large amount of space is required. In addition, known control circuits for pulsed gas lasers have the disadvantage that a subsequent reequipping and in particular addition of additional sensors and control members is very involved. Also, fault tracing and repair of the known control circuits is very complicated.

SUMMARY OF THE INVENTION

The invention is based on the problem of remedying the aforementioned disadvantages and providing a control circuit for pulsed gas lasers with which with excellent function the number of necessary collecting lines and connectors can be reduced. In addition, the invention is also intended to facilitate fault tracing and repair of the control circuit.

The solution of this problem according to the invention is characterized in claim 1.

By the combination of associated sensors and control members in a compact module the length of the lines to be shielded is considerably reduced because the individual modules can be arranged directly in the vicinity of the sensors and control members.

The connections of the individual modules provided according to the invention via optical waveguides do not require any shields from electromagnetic interferences and ensure reliable signal transmission even with relatively great line lengths.

The connection according to the invention of the individual modules to the central control unit by means of a ring structure formed from optical waveguides makes it possible for an additional module to be installed in simple manner. Moreover, irrespective of the number of modules used only a single input and a single output for optical waveguides is required at the central control unit.

In an economic further development of the invention the modules and the central control unit are connected by plastic optical waveguides.

A particularly good interference suppression in signal transmission is achieved when the sensor signals are digitized in the modules and only digital signals are transmitted along the optical waveguides.

In a preferred embodiment of the invention the central control unit monitors the function of the optical waveguide ring by furnishing a signal at its output and investigating the signal which arrives at its input and which has passed the optical waveguide ring. In this manner a defect of an optical waveguide or a loose connector of an optical waveguide or also a defect in one of the optical transmitters and receivers can be detected and an alarm initiated.

To facilitate data traffic on the optical waveguide ring each module can be provided with a buffer which is read out and/or written to by the central control unit.

In a further preferred development of the invention each module comprises a monitoring circuit having a timing member which is periodically reset and when no resetting takes place after expiry of a predetermined interval of time initiates an alarm signal. The central control unit addresses each module at regular intervals, interrogates the contents of the buffer and on each addressing of the module by the central control unit the timing member is reset by the microprocessor provided in the module. With these steps both the satisfactory function of the optical waveguide ring and the function of the microprocessors in the individual modules is monitored.

In a further development of the invention to further increase the safety each module on exceeding predetermined values in the safety monitoring automatically brings the control member associated with the respective module into a noncritical state for the laser and writes an alarm signal into the associated buffer.

To permit the fastest possible data transmission on the optical waveguide ring in a further development of the invention each module comprises at its optical waveguide input a transducer which transforms the optical input signal into an electrical signal which is supplied from the output of the transducer both to the microprocessor in the respective module and via a gate circuit to an output transducer which transforms the electrical signal back into an optical signal. With this arrangement the signal transmission is not delayed by the processing time in the microprocessor of the module and the signal passes without appreciable delay from one module to the next until along the closed ring it again reaches the central control unit.

If the laser is provided with a trigger unit for firing the gas discharge then in a preferred embodiment of the invention said trigger unit is connected via a separate optical waveguide, which is not included in the ring structure, to the central control unit. This achieves at the same time minimum delay with respect to the trigger signal and interference-free transmission.

To minimize the work involved in replacing a module or expanding the instrumentation of the laser in another further development of the invention a method is provided for initializing the laser in which an address is allocated to each module, the central control unit in the initialization consecutively calls up all the possible addresses, the modules on calling up of their address furnish a signal from which the central control unit can derive the nature of the module and possibly its configuration variant, and in which the central control unit utilizes the associated control program in accordance with the modules present. The central control unit then recognises the newly inserted module and if the module is not of identical type can automatically make any parameter adaptations which may be necessary. Equally, when an additional module is installed the central control unit can recognise the nature of the module and select an appropriate operating program.

Examples of embodiment of the invention will be explained in detail hereinafter with the aid of the drawings, wherein:

DESCRIPTION OF THE PREFERRED EMBODIMENTS

Figure 1:
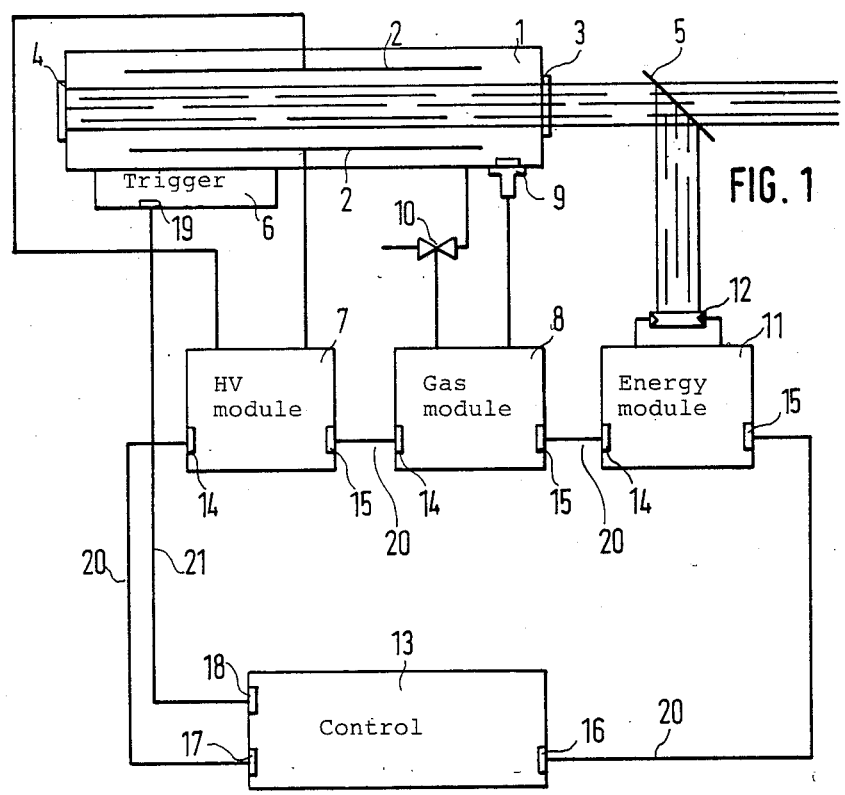
FIG. 1 is a block circuit diagram of a gas laser including a control circuit.

The gas laser shown in FIG. 1 in a schematic block circuit diagram comprises a laser resonator 1, two electrodes 2 for electrical stimulation of the working gas in the laser resonator and two mirrors 3, 4. The rear mirror 4 reflects approximately 100% of the incident radiation whilst the front mirror 3 allows a proportion of for example 90% of the radiation to pass (in an excimer laser) and serves to couple the light power out of the laser resonator 1. The mode of operation of pulsed gas lasers is generally known and therefore need not be explained again in detail here.

The control circuit of the example of embodiment shown in FIG. 1 has three modules. A module here means a self-contained functional unit which can be replaced as a whole. These modules are a high-voltage module 7, a gas module 8 and an energy module 11.

The high-voltage module 7 generates a high voltage for the electrodes 2 of the laser. The high-voltage module 7 comprises as sensor a measuring means for the high voltage obtaining between the electrodes 2 and as control member a voltage control circuit with which the high voltage between the electrodes 2 is adjustable.

A trigger unit 6 triggers the gas discharge between the electrodes 2.

The gas module 8 comprises as sensor a pressure pickup 9 with which the pressure of the gas in the laser resonator 1 is measured. A valve 10 is associated as control member with the gas module 8 and the pressure of the gas in the laser resonator 1 can be adjusted with said valve.

The energy module 11 comprises as sensor a radiation detector 12 to which by means of a semi-reflecting mirror 5 a small proportion of the optical output power of the laser is branched off.

The modules 7, 8 and 11 are monitored and controlled by a central control unit 13.

For connecting the individual modules 7, 8 and 11 to the central control unit 13 each module comprises an optical waveguide input 14 and an optical waveguide output 15. Correspondingly, the central control unit 13 comprises an optical waveguide input 16 and an optical waveguide output 17. The inputs and outputs of the modules 7, 8 and 11 and of the central control unit 13 are connected together via optical waveguides 20 in such a manner that as a whole a ring structure according to FIG. 1 is formed. The modules 7, 8 and 11 and the central control unit 13 are thus connected in series with respect to each other.

Only the trigger unit 6 is connected with its input 19 via a separate optical waveguide 21 to a separate output of the central control unit 13. This makes it possible to transmit the particularly time-critical trigger signal without impairing the data traffic on the ring formed from the optical waveguides 20 and the modules 7, 8 and 11.

As will be explained in detail hereinafter with reference to FIG. 2 the individual modules 7, 8 and 11 pass a signal arriving at their input 14 unchanged and substantially without delay to their output 15 so that a signal furnished at the output 17 of the central control unit 13 is returned in an annular signal flow via the optical waveguides 20 and the modules 7, 8 and 11 to the input 16 of the central control unit 13. With this arrangement by means of the central control unit 13 it is possible to monitor satisfactory functionality of the optical waveguide ring including the interposed optical waveguides, connectors, modules and optical transmitters and receivers. For this purpose the central control unit 13 need only compare the signal received at the input 16 with the signal emitted at the output 17.

If the signal received at the input 16 of the central control unit 13 does not conform with the signal furnished at the output 17 the central control unit 13 emits a corresponding fault message.

With the ring array of the modules according to the invention it is also possible to locate easily a defect in one of the modules. For this purpose it is only necessary to remove (bridge) a module from the ring. This makes it possible to narrow the defect down easily to the defective module or the defective optical waveguide.

The optical waveguides consist in the examples of embodiment illustrated of plastic.

Figure 2:
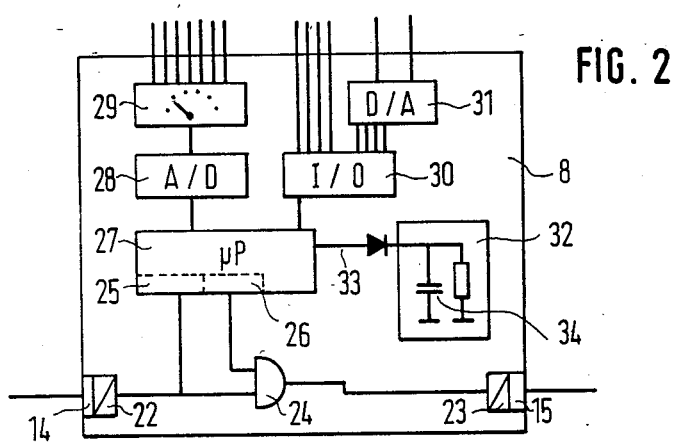
FIG. 2 is a block circuit diagram of a single module.

FIG. 2 shows a block circuit diagram of a single module. The arrangement of the module according to FIG. 2 is suitable for the high-voltage module 7, the gas module 8 or also the energy module 11.

At the optical waveguide input 14 of the module according to FIG. 2 there is firstly a transducer 22 which transforms the optical signal conveyed via the optical waveguide 20 to an electrical signal. The electrical signal passes via a gate 24, which is normally kept open by a microprocessor 27, to a transducer 23 which transforms the electrical signal back into an optical signal which is then passed on at the output 15 to the next optical waveguide 20. In this manner the signal arriving at the module is passed on without appreciable delay to the next module or to the central control unit 13.

The microprocessor 27 comprises buffers 25 and 26. The central control unit 13 can write to the buffer 25 the data and commands which are subsequently processed by the microprocessor 27. The microprocessor 27 can write to the buffer 26 data which is called up and read out by the central control unit 13. The expert is readily able to provide the details of the data transmission such as the definition of a transmission log with start symbols, the choice of the addresses and information areas, etc., and consequently these details need not be explained.

The module illustrated in FIG. 2 (which is schematically representative of one of the modules 7, 8 or 11) comprises for the connection to the associated sensor 5 (i.e. for example a high-voltage meter for the high-voltage module 7 or a pressure pickup 9 for the gas module 8) a multiplexer 29 and an analog/digital converter 28. An I/O port 30 is provided as connection to the control members (i.e. for example in the gas module 8 to the gas valve 10) which require a digital control signal (such as control transistors, relays, etc.). For control members which require an analog signal, such as adjusting valves, a digital/analog converter 31 is also connected behind the I/O port 30. The example of embodiment of a module illustrated in FIG. 2 is intended only by way of example and individual circuit components can be omitted or additional circuit components added in accordance with the task of the module.

The module shown in FIG. 2 is also provided with a so-called watchdog circuit 32. The control program of the microprocessor 27 causes the capacitor 34 to be charged periodically via the line 33 to a desired value. This charging operation of the capacitor 34 can be considered as resetting or zero setting of the watchdog circuit. If the resetting, i.e. the charging of the capacitor 34 to the desired value, does not occur the watchdog circuit initiates an alarm when the voltage at the capacitor 34 drops below a predetermined voltage and sets the control members (for example the control valve 10) associated with the respective module to a state which is noncritical for the laser. Now, if the resetting of the watchdog circuit is initiated whenever the microprocessor 27 detects that it has been addressed by the central control unit 13 and the central control unit 13 addresses each module 7, 8, 11 periodically at regular intervals then the watchdog circuit will monitor the satisfactory recognition of the own address by the microprocessor 27. On failure of the central control unit 13 as well the watchdog circuits of all the modules or the control members associated with the modules switch to a noncritical state because of course no addressing of the modules by the central control unit 13 is present.

Accordingly, when predetermined limit values are exceeded at the associated sensors the microprocessor 27 as local control element can also set the control members (i.e. for example the valve 10) associated with said module to a noncritical state. At the same time the microprocessor writes an alarm signal to the buffer 26 which in the next interrogation cycle is read out and processed by the central control unit 13. Thus, all the important parameters of the laser can be specifically monitored via the individual modules.

Figure 3:
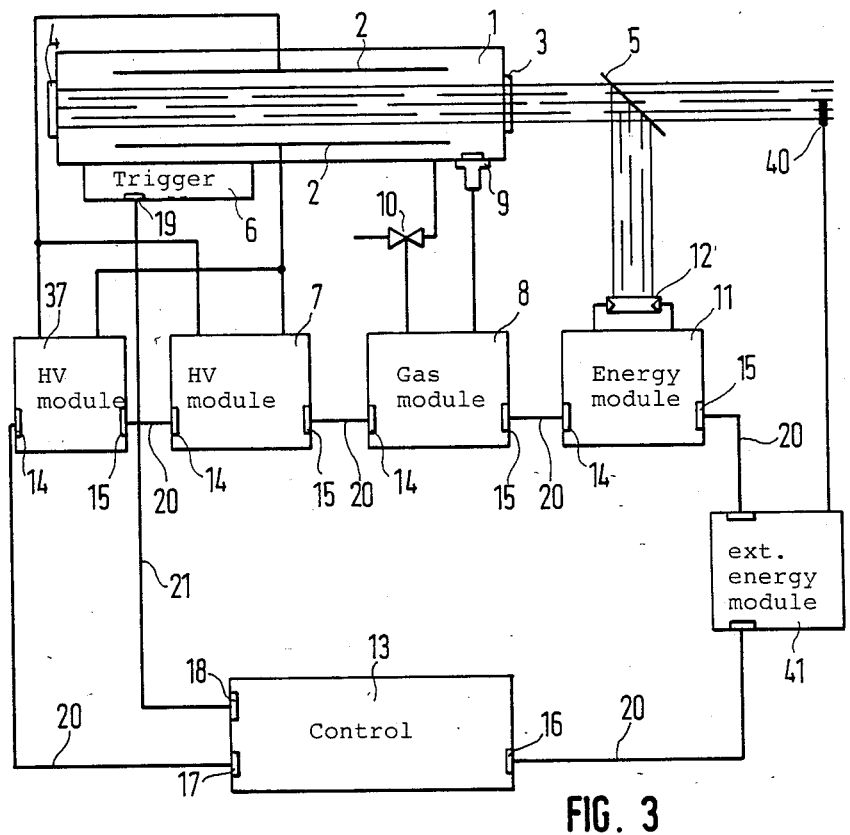
FIG. 3 is a block circuit diagram of a further example of embodiment of a control circuit for a gas laser and FIG. 4 is a flow chart of the initialization procedure for a control circuit according to FIGS. 1 to 3.

FIG. 3 shows in comparison with FIG. 1 how the control circuit previously described can easily be expanded by further modules. The additional high-voltage module 37 and the additional energy module 41 compared with the example of embodiment of FIG. 1 are simply inserted into the ring of optical waveguides 20. The remaining modules and the central control unit 13 are not changed compared with the example of embodiment of FIG. 1 and are therefore denoted by the same reference numerals. The additional high-voltage module 37 serves to increase the pulse peak current of the gas discharge in the laser resonator 1 and thus to increase the output power of the laser. The additional energy measuring module 41 is provided with an external optical sensor 40 which is arranged directly at the location of the working process which is to be carried out by the laser beam. With the sensor 40 arranged directly at the working location of the laser beam the laser power is measured directly where it is used and account taken of any power losses on the transmission path from the laser to the working location.

The invention thus permits simple insertion of additional modules into the ring circuit of optical waveguides and other modules.

Figure 4:
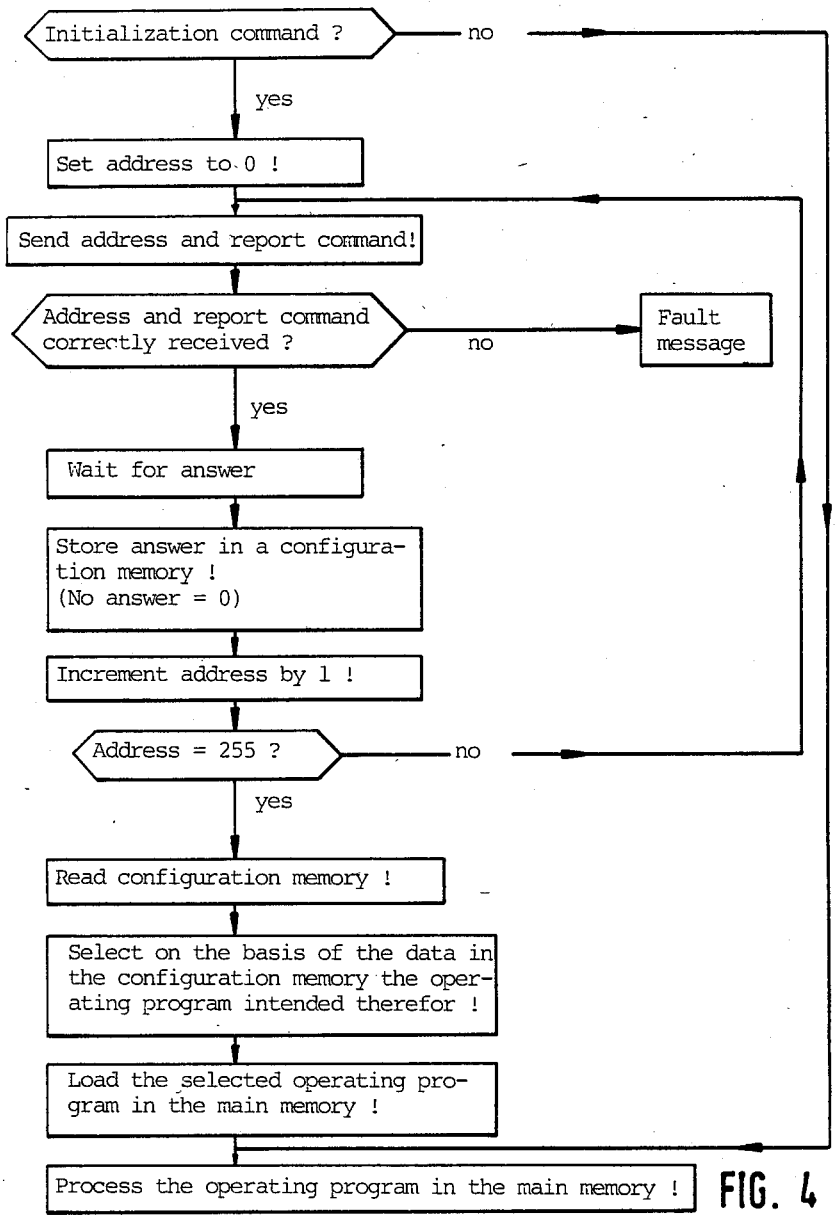

To enable such an expansion of the control circuit with further modules to be carried out as simply as possible without complicated modifications of the software a special initialization procedure is proposed which will be explained hereinafter with reference to the flow chart of FIG. 4.

When the initialization command is given the central control unit sets an address counter to 0, emits the address 0 and a specific report command and checks whether these data transmitted at the transmitter 17 arrive again unmutilated after a certain transient time at the receiver 16. If they do not an error message is output (e.g. "optical waveguide ring not functioning properly"). If however the data have arrived properly the central control unit waits a certain time, which derives from the known reaction time of a module, for an answer of the addressed module No. 0. Any answer is stored in a configuration memory and when no answer is received a 0 is stored. This operation is repeated with the address 1, etc., until the maximum predetermined address scope is reached (in the example 0 . . . 255). For this automatic initialization an address number is associated with each module and with modules which are always only present once in the control system a fixed association can be made and for modules which may occur several times, for example the high-voltage modules, the association can for example be done by DIP switches within a certain range. Furthermore, the modules contain in the storage area of the built-in microprocessors coded information from which the type of the module and also any possible different constructional forms, manufacturing years, etc., are apparent. When the address allocated to the module and the message command are received the module transmits this information and it is received as described by the central control unit and stored in the configuration memory.

Once the data of all the modules are stored in the configuration memory the central control unit reads said data out and selects the operating program intended therefor and loads it into a main memory. (The various possible operating programs may for example be stored on a floppy disk and the selected operating program transferred to an EEPROM; this ensures both storing a large number of operating programs and rapid access to the operating program which happens to be running.) The operating program in the main memory is then processed just as in the case where no initialization command was given at the beginning.

Only the basic outlines of the initialization procedure have been given above. Further details, for example a checking of addresses occupied multiply by modules or the details of the coding and storing can be added by any electronics expert.

Furthermore, it is also readily possible to design the control unit so that via an optical waveguide ring it controls the modules of two or more lasers. Due to the easy expandability of the optical waveguide ring explained this is readily possible provided that the central control unit can process the larger amounts of data or is given more time for the processing by a lower laser pulse repetition frequency.

What is claimed is:

1. Control circuit for at least one pulsed gas laser, comprising
    a high voltage module (7) connected to the laser,
    a plurality of sensors (9,12) for detecting states of the laser and for producing outputs relating to said states, each said sensor being positioned for detecting one said state,
    at least one control member (10) connected to one said module for controlling the laser,
    a plurality of modules (7, 8, 11, 37, 41), each module including at least one microprocessor, and further including an input (14) and an output (15), with each of said sensors (9, 12) being connected to one of said modules, and
    a central control unit (13) having an input (16) and an output (17), with said modules (7, 8, 11, 37, 41) and said control unit (13) being connected via said inputs (14, 16) and said outputs (15, 17) in ring structure by means of optical waveguides (20), said control unit (13) being for processing signals furnished by the sensors (9, 12) and for controlling the control member (10).

2. Control circuit according to claim 1, characterized in that said optical waveguides (20) are formed from plastic.

3. Control circuit according to claim 1, characterized in that at least one said module (7, 8, 11, 37, 41) includes, at its input (14), a first optical transducer (22) for converting digital optical signals received on said waveguide (20) into electrical signals, and, at its output (15), a second optical transducer (23) for converting said electrical signals back into digital optical signals, with said first and second optical transducers (22, 23) being connected for transmission of said electrical signals from said first optical transducer (22) to said second optical transducer (23).

4. Control circuit according to claim 1, characterized in that
    the central control unit (13) includes means for monitoring said optical waveguide ring by testing whether a signal furnished by said unit at its optical waveguide output (17) conforms with a signal at its optical waveguide input (16).

5. Control unit according to claim 1, characterized in that
    the modules (7, 8, 11, 37, 41) contains buffers (25, 26), and
    the central control unit (13) includes means for writing data and commands into said buffers (25, 26) and means for reading data and commands out of said buffers (25, 26).

6. Control circuit according to claim 5 in which each module (7, 8, 11, 37, 41) includes a monitoring circuit (32) with a timing member (34) which is periodically reset and when no resetting is made after expiry of a predetermined period of time initiates an alarm signal, characterized in that
    the central control unit (13) addresses each module at regular time intervals, interrogates contents of the buffer (26) and on each addressing of the module by the central control unit the timing member is reset by the microprocessor (27) present in the module.

7. Control circuit according to claim 5, characterized in that each said microprocessor (27) of said modules (7, 8, 11, 37, 41) includes a buffer (26) and means for writing an alarm signal to said buffer (26) and means for bringing each said control member (10) into a noncritical state when said sensors detect signals exceeding predetermined limit values.

8. Control circuit according to claim 1, characterized in that
    each module (7, 8, 11, 37, 41) comprises at its optical waveguide input (14) a transducer (22) which transforms the optical input signal to an electrical signal and that the electrical signal from the output of the transducer (22) is supplied both to the microprocessor (27) and via a gate circuit (24) to an output transducer (23) which transforms the electrical signal back into an optical signal.

9. Control circuit according to claim 1 comprising a trigger unit (6) for triggering the laser, characterized in that
    the trigger unit (6) is connected via a separate optical waveguide (21) directly to the central control unit (13).

10. Method for initializing a pulsed gas laser with a control circuit, wherein the control circuit includes:
    a high voltage module (7) connected to the laser;
    a plurality of sensors (9, 12) positioned for detecting states of the laser and for producing outputs relating to said states;
    at least one control member (10) connected to one said module for controlling the laser;
    a plurality of modules (7, 8, 11, 37, 41), each module including at least one microprocessor and further including an input (14) and an output (15), with each of said sensors (9, 12) being connected to one of said modules; and
    a central control unit (13) having an input (16) and an output (17), with said modules (7, 8, 11, 37, 41) and said control unit (13) being connected via said inputs (14, 16) and said outputs (15, 17) in a ring structure by means of optical waveguides (20), said control unit (13) being for processing signals furnished by the sensors (9, 12) and for controlling the control member (10);
    wherein an address is allocated to each module (7, 8, 11, 37, 41), such that the central control unit (13) consecutively calls up all the possible addresses, and the modules on calling of their address furnish a signal relating to characteristics of the modules.

* * * * *